Feb. 15, 1944.   N. S. McNAB   2,341,730
ANTIFRICTION BEARING
Filed May 11, 1942   2 Sheets-Sheet 1

Inventor
Norman S. McNab
by Wilkinson & Mawhinney
Attorneys

Feb. 15, 1944.　　　N. S. McNAB　　　2,341,730
ANTIFRICTION BEARING
Filed May 11, 1942　　　2 Sheets-Sheet 2

Inventor
Norman S. McNab
by Wilkinson &
Mawhinney
Attorneys

Patented Feb. 15, 1944

2,341,730

UNITED STATES PATENT OFFICE 2,341,730

ANTIFRICTION BEARING

Norman Sinclair McNab, Gloucester, England, assignor to Rotol Airscrews Limited, Gloucester, England, a British company Application May 11, 1942, Serial No. 442,503
In Great Britain April 9, 1941

2 Claims. (Cl. 308—187.1)

This invention relates to anti-friction bearings, including thrust-bearings, which operate at very high speeds and particularly those in which both the inner and outer races rotate, so that there is a high relative speed.

Such a bearing is used for transmitting pitch-changing movements imparted to the blades of a first airscrew by suitable mechanism to the blades of a second airscrew coaxial with the first airscrew.

In this application of a thrust-bearing, the inner race rotates with the first airscrew and is moved axially by the pitch-adjusting mechanism, the outer race being connected to the blades of the other airscrew so as to impart the pitch-changing movement to them.

The two races of the bearing, which is preferably a ball-thrust-bearing, therefore rotate in opposite directions, the relative velocity being high, for example, of the order of 3,000 revolutions per minute.

When it is not possible or convenient to give a constant supply of lubricant to such a bearing the problem of lubrication arises, since the relative speed of the races is high, and the thrust to be transmitted by the bearing is also high, being, for example, of the order of three tons.

Packing such a bearing with lubricant is not effective because, with the thick lubricants or grease used for this purpose, the relative speed of the races causes a heating effect, which is detrimental to the lubricant and the bearing.

An object of this invention is to provide means for lubricating a bearing of the kind described.

According to the invention, the inner race is provided with end-plates extending radially towards the outer race, and the outer race is provided with sealing members overlapping the end-plates to provide reservoirs in communication with the space between the races, wherein the sealing-members are resilient and they may be so formed as to be distorted when subjected to centrifugal force so that they move away from contact with their co-operating members thereby eliminating wear.

Figure 1:
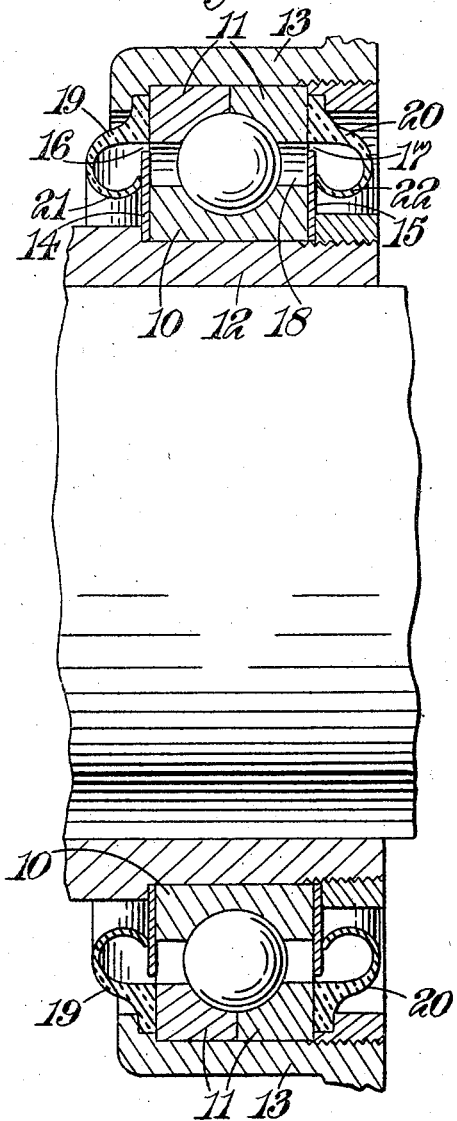
Figure 2:
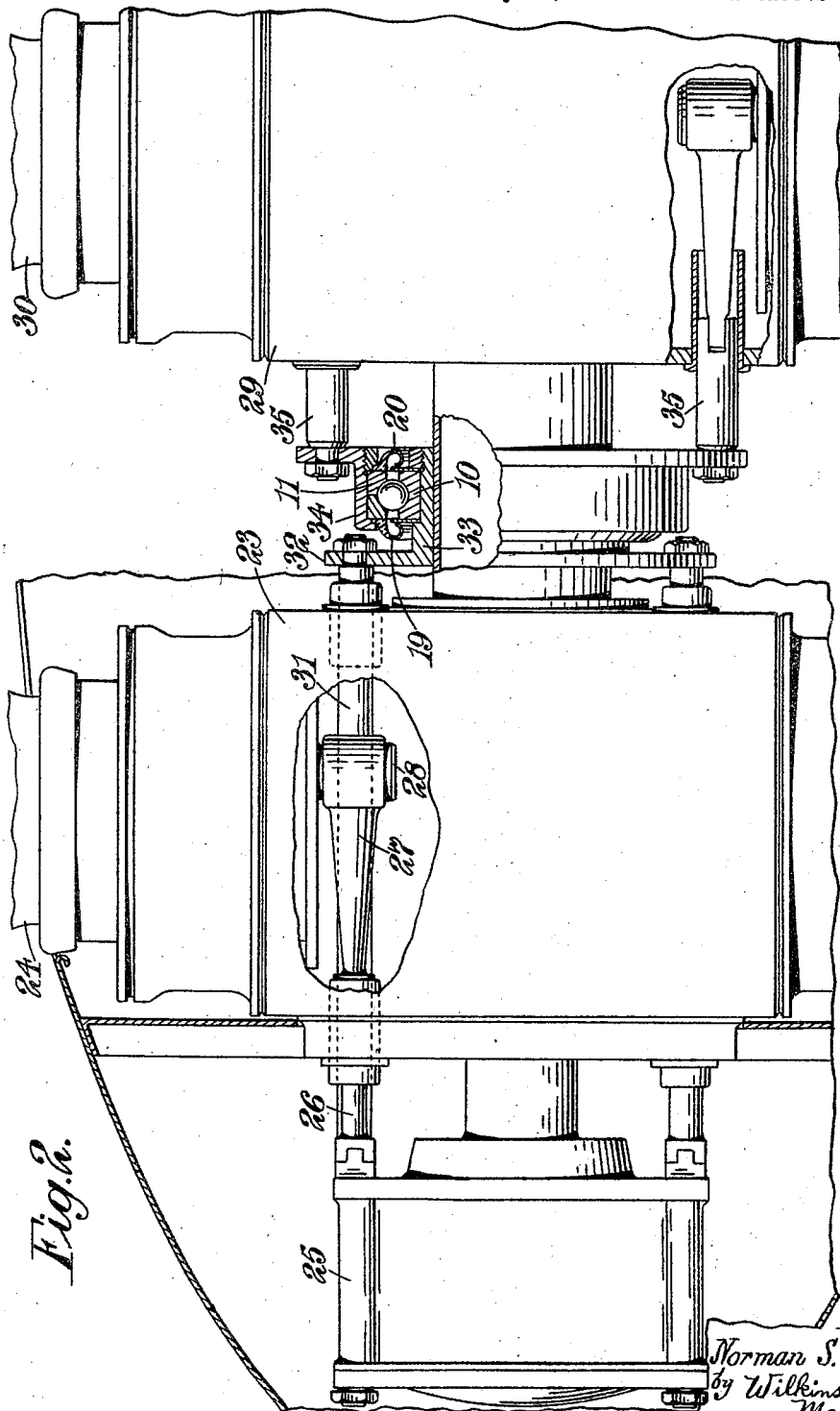

In the accompanying drawings:

Figure 1 is a sectional view of a bearing according to the present invention, and Figure 2 shows the application of the invention to a thrust-race used with co-axial contra-rotating variable-pitch airscrews, for the purpose of transmitting pitch-changing movements to the blades of one of the airscrews.

Referring first to Figure 1, which illustrates the application of the invention to a ball-thrust-bearing of normal construction, the bearing comprises an inner race 10 and a divided outer race 11 of normal construction; the inner race is mounted on a sleeve 12 and the outer race in a housing 13.

On each side of the inner race there is provided an end-plate 14, 15 respectively which is held closely against the end face of the race 10, being engaged between it and the co-operating part of or on the sleeve 12 which locates the race. These end-plates 14, 15 extend radially beyond the periphery of the race 10 towards the race 11, but are so dimensioned as to leave gaps 16, 17 communicating with the space 18 between the two races.

The outer race 11 carries a pair of sealing-members 19, 20, one on each end face thereof to co-operate with the end-plates 14, 15, and these are so shaped as to provide each an annular cavity which communicates by the openings 16, 17 aforesaid with the space between the races. Each of the elements 19, 20 is formed with an inturned lip 21, 22 which lies very close to the adjacent end-plate or may even be in contact therewith, so as to prevent escape of the lubricant.

When the bearing is stationary the lubricant collects at the lower part in the reservoir whereof the base is constituted by the inner face of the outer race, and the side walls are constituted by the sealing-members 19, 20. The end-plates 14, 15 project downwards into this reservoir, but do not of themselves retain lubricant therein, owing to the presence of the gaps 16, 17.

When the bearing commences to rotate, the oil is distributed over the outer race by centrifugal action and moreover lubricates the balls themselves. When the speed of rotation of the races in opposite directions is more or less equal, the balls will have a slow processional movement, but will mainly rotate each about its own axis which assists in the distribution of the lubricant on to the inner race so that a uniform distribution is obtained.

The amount of lubricant employed in the bearing is preferably such that under running conditions there will be only a thin film of oil on the working faces of the races and balls, and when the bearing is stationary this small amount will be retained in the reservoir as above described without loss. The use of only a small quantity of oil is advantageous in that it tends to reduce the generation of heat by fluid-friction in the body of the oil.

The sealing-members 19, 20 are made of rubber or other resilient oil-resisting material of suitable cross-section, so that the lips 21, 22 are only pressed very lightly against the end-plates 14, 15, although it is not necessary that they should even make contact; the cross-sectional shape of the ring may be so selected that when the bearing is in rotation, these sealing-members will distort slightly under centrifugal effect to move the lips away from the end-plates, since there is no risk under such conditions of any loss of oil, owing to it being maintained, mainly on the outer race, by centrifugal action.

Any convenient means may be used for securing the sealing-members 19, 20 in oil-tight engagement with the outer race 11, and in the construction illustrated, the outer margin of each of the members is gripped between a shoulder on the housing 13 or some co-operating part, and the end-face of the race 11.

This device has been found to provide a satisfactory solution for the difficult problem of adequately lubricating a thrust-bearing used for transmitting pitch-changing movements between co-axial contra-rotating variable-pitch airscrews.

Figure 2 shows the arrangement diagrammatically; a front airscrew-hub 23 carrying blades 24, has a hydraulic ram 25 mounted at the forward end of its shaft, the cylinder of the ram being movable relatively to a fixed piston in it and being coupled by rods 26 and links 27 to crank-pins 28 on the root ends of the blades 24 to effect their pitch-changing movements. The rear airscrew-hub 29 carrying the blades 30, which rotates in the opposite direction to the hub 23, is required to be moved by the same ram 25 and for this purpose the cylinder is connected by rods 31 to the flange 32 of a sleeve-member 33 whereon is secured the inner race of a thrust-bearing as illustrated in Figure 1. The outer race of this bearing is mounted in a housing 34 which is connected by rods and links 35 to crank-pins on the roots of the blades 30. The sleeve-member 33 is moved axially by the hydraulic ram 25 and the thrust-bearing transmits such movements to the housing 34 and thereby effects the adjustment of the blades 30 of the second airscrew.

I claim:

1. A bearing comprising spaced inner and outer races, end plates projecting substantially radially from the inner race to points short of the outer race, and sealing members on the outer race having resilient outwardly bowed portions forming reservoirs in communication with the space between the races, the free edges of said portions resting freely against said end-plates, said resilient outwardly-bowed portions incident to centrifugal force withdrawing said free edges from contact with said end-plates to eliminate wear.

2. In combination, co-axial contra-rotating variable-pitch airscrews, rotary and axially-movable connections to said airscrews for transmitting pitch-changing movements to the blades, spaced inner and outer races respectively supported by and movable with said connections, bearings between said races, end-plates extending from the inner race to points short of the outer race, and sealing members extending from the ends of the outer race toward but short of the inner race and in overlapping reaction to said end-plates, said sealing members having inner edges freely contacting the outer faces of said plates, and further having intermediate resilient portions bulged outwardly to constitute lubricant chambers in communication with the space between the races, said resilient portions having their centers of mass offset outwardly of their points of connection to the outer race whereby centrifugal force acting on said resilient portions will withdraw said free edges from contact with said end-plates.

NORMAN SINCLAIR McNAB.